US009867367B2

(12) United States Patent
Schild, III et al.

(10) Patent No.: US 9,867,367 B2
(45) Date of Patent: Jan. 16, 2018

(54) ENTRYWAY SEALS AND VERMIN BARRIER (71) Applicant: GLOBAL MATERIAL TECHNOLOGIES, INC., Buffalo Grove, IL (US)

(72) Inventors: Kurt H Schild, III, Wadsworth, IL (US); Mieczyslaw F. Boczek, Bloomingdale, IL (US); David A. Colbert, Palatine, IL (US); Mark Rak, Orland Park, IL (US); Mariusz Walus, Willow Springs, IL (US)

(73) Assignee: Global Material Technologies, Incorporated, Buffalo Grove, IL (US)

( * ) Notice: Subject to any disclaimer, the term of this patent is extended or adjusted under 35 U.S.C. 154(b) by 0 days.

(21) Appl. No.: 13/787,762

(22) Filed: Mar. 6, 2013

(65) Prior Publication Data

US 2014/0250788 A1    Sep. 11, 2014

(51) Int. Cl.
*A01M 29/30* (2011.01)
*A01M 29/34* (2011.01)

(52) U.S. Cl.
CPC ............ *A01M 29/30* (2013.01); *A01M 29/34* (2013.01)

(58) Field of Classification Search
CPC .............................. A01M 29/30; A01M 29/34
USPC ...... 49/478.1, 489.1, 498.1, 469, 470, 496.1
See application file for complete search history.

(56) References Cited

U.S. PATENT DOCUMENTS

| 2,102,578 | A | * | 12/1937 | Gail | 49/493.1 |
| RE21,337 | E | * | 1/1940 | Hamm | 49/500.1 |
| 2,195,046 | A | * | 3/1940 | Best | 49/498.1 |
| 3,124,725 | A | * | 3/1964 | Leguillon | 335/303 |
| 3,374,580 | A | * | 3/1968 | Ruff | 49/482.1 |
| 3,578,764 | A | * | 5/1971 | Nunnally | D04D 1/00 174/357 |
| 4,017,116 | A | * | 4/1977 | Hulsey | 296/156 |
| 4,419,844 | A | * | 12/1983 | Kreisfeld | 49/475.1 |
| 5,150,544 | A | * | 9/1992 | Burnett | 49/493.1 |
| 5,347,759 | A | * | 9/1994 | Kobayashi et al. | 49/496.1 |
| 5,465,532 | A | * | 11/1995 | Varin | 49/493.1 |
| 5,727,356 | A | * | 3/1998 | Ensinger et al. | 52/717.02 |
| 5,948,505 | A | * | 9/1999 | Puppin | 428/121 |
| 6,189,198 | B1 | * | 2/2001 | Keeney et al. | 29/527.4 |
| 6,253,493 | B1 | * | 7/2001 | Sauve | 49/470 |
| 6,502,289 | B1 | * | 1/2003 | Kane et al. | 28/107 |
| 6,761,954 | B2 | * | 7/2004 | Hauser | B29C 47/0021 428/108 |
| 7,401,439 | B2 | * | 7/2008 | Heroux | E06B 7/2316 277/921 |
| 2002/0092242 | A1 | * | 7/2002 | Hope | 49/475.1 |

(Continued)

*Primary Examiner* — Gregory Strimbu
(74) *Attorney, Agent, or Firm* — Patzik, Frank & Samotny Ltd.

(57) ABSTRACT

An apparatus for substantially sealing a gap disposed between an edge of a door and a surface, which, upon the attachment of the apparatus to the door, results in substantially impeding movement of vermin about the edge, the apparatus includes: (i) an outer material that substantially forms a seal between the edge and the surface; (ii) an inner material in contact with the inner surface of the outer material, wherein the inner material forms a gnaw-resistant barrier to vermin; and (iii) at least one connecting member in contact with the outer material that connects the apparatus to the edge of the door.

14 Claims, 9 Drawing Sheets

(56) References Cited

U.S. PATENT DOCUMENTS

| | | | |
|---|---|---|---|
| 2009/0000216 A1* | 1/2009 | Kane | A01M 29/30 52/101 |
| 2013/0097937 A1* | 4/2013 | Flasher | D06F 58/04 49/492.1 |
| 2013/0333294 A1* | 12/2013 | Vulpitta | E06B 7/26 49/468 |

* cited by examiner

ENTRYWAY SEALS AND VERMIN BARRIER

BACKGROUND OF THE INVENTION

The field of the present invention relates generally to building materials designed to retard or prevent entry of outside weather or vermin into a structure at a closed entryway to a building.

An age-old problem of entryway design for buildings relates to the dual issues of excluding inclement weather and vermin from entering or impacting the interior when the entryway is shut. Materials engineers have made excellent progress in excluding inclement weather by use of flexible synthetic or rubber strips that are installed at the perimeter of the door at an entryway. Another category of flexible strips for controlling internal temperature are manufactured with rows of tightly packed bristles.

However, vermin are wily and persistent in the face of currently-known flexible barriers that are ostensibly keeping them from shelter and/or food. The term vermin relates to animals considered to be pests, including but not limited to rodents, such as rats, mice, squirrels, and the like. Other sorts of vermin include snakes and arachnids of all sorts, but notably insects, spiders, and scorpions. Particularly when the outside becomes cold and/or wet, and the vermin on the spot has a desire to seek the heat and dry environs of the interior of a building, synthetic or rubber or bristle strips may present a challenge but not a lasting one; and far less so if the vermin senses a food prize in the interior as well.

The age-old problem becomes more than a nuisance and a source of domestic discord when the invaded building is a warehouse that houses, for example, grain or other foodstuffs. In the face of such a prize of a warehouse full of food product, one can bet that rats and mice, for example, will seek a way in.

A needed improvement to currently available seal strips for building entryways is therefore needed. The inventive concept set forth herein below answers this need.

SUMMARY OF THE INVENTION

The present invention provides an apparatus that answers the needed improvement in currently available entryway seals and the like, such as door sweeps. In particular, in one embodiment, the present invention provides an apparatus for connecting an edge of a door to a surface, which, upon said edge and said surface being connected by said apparatus, results in substantially impeding movement of fluid or vermin about the edge, which apparatus comprises: (i) an outer material that substantially forms a seal between the edge and the surface; (ii) an inner material that forms a gnaw-resistant barrier to vermin; and (iii) one or more connecting members that connect(s) the apparatus to the edge of the door; wherein the apparatus has a length that approximates the length of the edge to which the apparatus is connected. In a related embodiment, the inner material includes a metal, such as, for example, a metal fiber; which metal fiber can be incorporated into a woven metal fabric or a nonwoven metal fabric. In another related embodiment, the inner material comprises a composite nonwoven fabric comprised of a blend of metal fibers and non-metal fibers.

The nonwoven metal fabric usefully employed and included in the inner material, in one embodiment, is comprised of (a) a first layer of metal fibers; (b) a mesh layer that includes a top side and a bottom side; and (c) a second layer of metal fibers; wherein the first layer of metal fibers and the second layer of metal fibers each include a plurality of barbed projections and a rough barbed outer surface with irregular shaped cross-sections that vary along the lengths of the metal fibers and wherein further the metal fibers interengage with each other; and wherein the first layer of metal fibers is needle punched to the mesh layer on the top side and the second layer of metal fibers is needle punched to the mesh layer on the bottom side.

In an alternative embodiment, the inner material includes a composite nonwoven fabric comprising an interengaged mixture of metal fibers and nonmetal fibers.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

The present invention relates to an apparatus that functions to preclude or retard entry of fluids or vermin at the perimeter of a shut door. Gaps that permit free entry of fluids or vermin or both commonly arise and expand over time due to mechanical wear and tear. The inventive apparatus is designed to address such gaps by reliably maintaining a close connection between door edge and door frame (or adjoining wall) and/or threshold despite the inevitable destructive acts of vermin wanting to enter. Of course, all materials eventually decay, and the inventive apparatus is no exception. But, unlike the prior art door sweeps or entryway seals, the inventive varieties set forth herein below retain their ability to frustrate the majority of vermin attempts to enter a building despite having its outer materials gnawed off in part (when composed of merely rubber or a flexible synthetic) for an extended period of time.

The inventive apparatus precludes or retards entry of fluids, such as air or water, especially that associated with inclement weather, in a fashion that will immediately be recognized from known approaches. For example, a door sweep blade or rounded surface (i.e., the cushion-style) composed of a rubber or flexible synthetic that is attached to a door edge that contacts the door's frame and/or threshold when the door is shut is indeed known. However, such prior art structures are not known to keep out the vermin noted above for long, particularly those known to be able to eat or tear through the material of the prior art structures used as door sweeps or seals.

As used herein, the term "sweep" and the term "seal", in either singular or plural forms, refers to same or similar structures of the present invention because the same structure used on the side of an opening to seal a vertical portion of an entryway can also be used to seal a horizontal portion of the same entryway. When used on the horizontal portion, the structure may be referred to as a sweep (presuming it is attached to a vertically hinged door). Accordingly, door seals and door sweeps are not used here to refer to necessarily different structures. The reader can infer from context when a structure is usefully employed as a sweep to seal the entryway versus as a side seal, for the same purpose but at a different portion of the entryway.

The exceedingly temporary nature of present-day door sweeps is well known, perhaps even more temporary when vermin sense a prize of food or shelter on the other side of the shut door. Upon reaching a barrier that cannot be readily breached, however, typical vermin head off to find an easier path.

A door sweep that includes a metal layer or, even better, a cuttingly sharp metal layer in addition to a flexible blade or rounded surface serves to discourage even the most intrepid of vermin. Such a door sweep can be an apparatus that connects an edge of a door to a surface (such as a door frame, adjoining wall, and/or threshold); or, better yet, connects all the edges of the door to the door frame (or adjoining wall) and threshold. When the edge of the door and the door surface are wholly connected by such an apparatus, vermin seeking entry are substantially impeded from doing so as is any fluid from the outside. Simply put, neither fluid nor animals can readily gain entry about the edge of a closed door that includes a door sweep, door seal, or side seal as described further herein below.

Figure 1A:
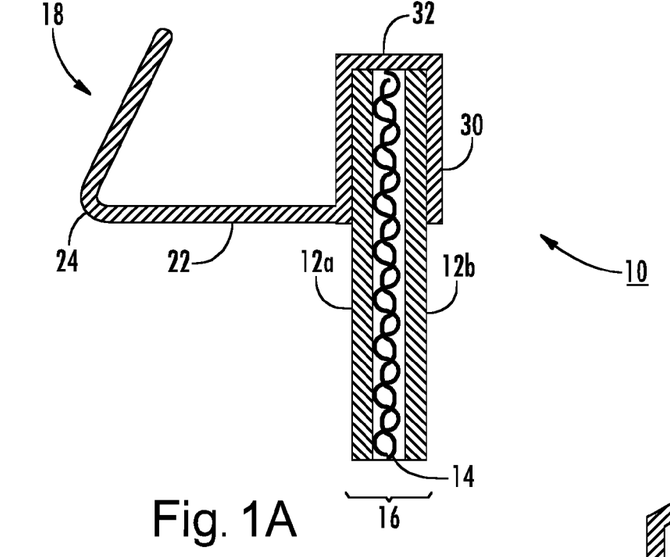
FIG. 1A is a cross-sectional view of one embodiment of a blade-style door sweep of the present invention, shown inserted into a mounting bracket.

Turning to FIG. 1A, a blade-style door seal of the present invention is shown in cross section with respect to one embodiment, where the rubber or synthetic outer material 12a and 12b can be seen to lie on either side of the gnaw-resistant and tear-resistant inner material 14. The combination of the outer material 12a and 12b and inner material 14, indicated by numeral 16, is inserted into a connecting member 18, also referred to as a mounting bracket. The outside portion 30 of the connecting member 18, as well as the bottom portion 22 and spring portion 24 of the connecting member 18 help orient one's viewing of the door sweep as mounted on door 20 in FIG. 1C.

Figure 1B:
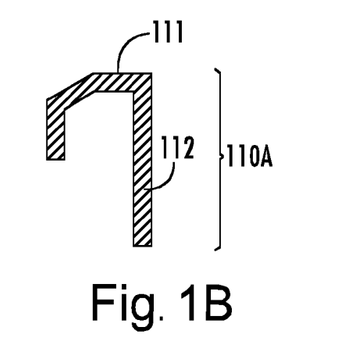
FIG. 1B is a cross-sectional view of an alternative bracket that can be employed with the door seals of the present invention.
Figure 1C:
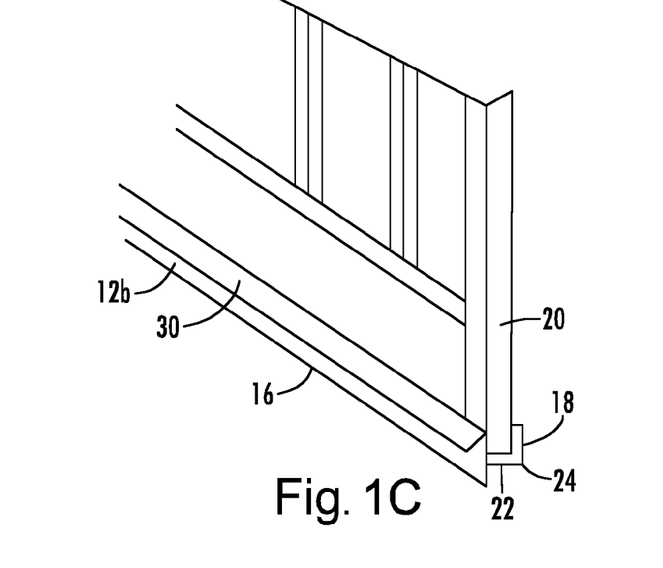
FIG. 1C is an isometric illustration of the blade-style lower edge door seal of the present invention shown in FIG. 1A as installed on a side-hinged door.
Figure 1D:
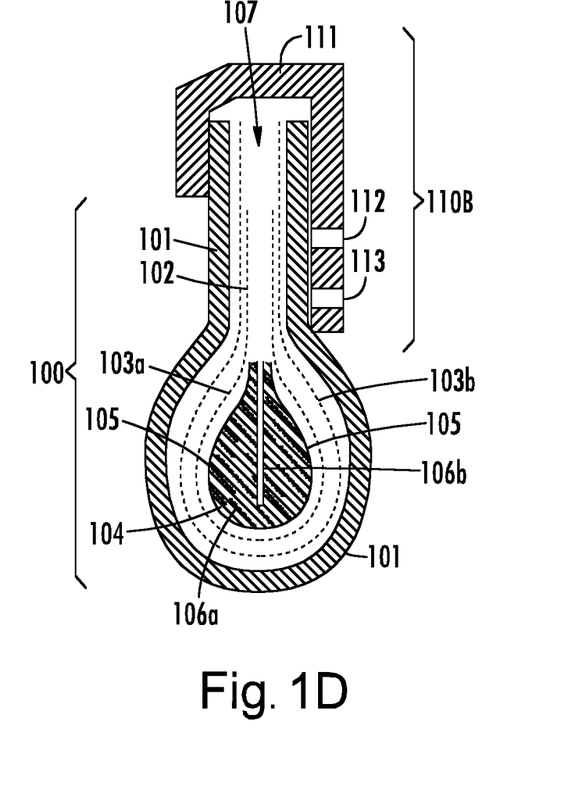
FIG. 1D is a cross-sectional view of one embodiment of a cushion-style for a vertically-oriented door, such as a garage door, shown inserted into a mounting bracket, which mounting bracket is the same as that depicted in FIG. 1B but for inclusion of two mounting apertures instead of one.
Figure 2A:
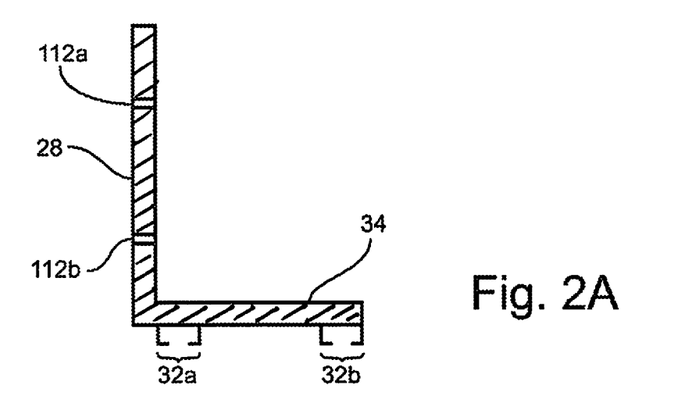
FIG. 2A is a cross-sectional view of a connecting bracket having suitable fittings for a double-T end connecting door seal.
Figure 3A:
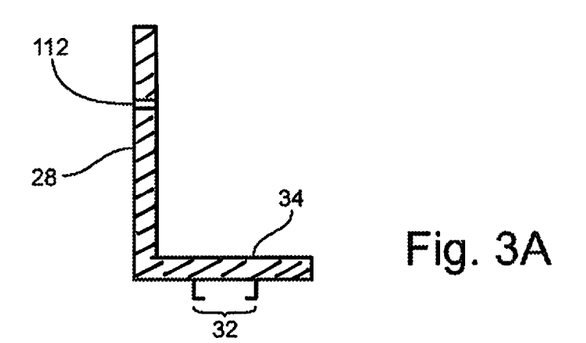
FIG. 3A is a cross-sectional view of a connecting bracket for a single-T end connecting door sweep.
Figure 4:
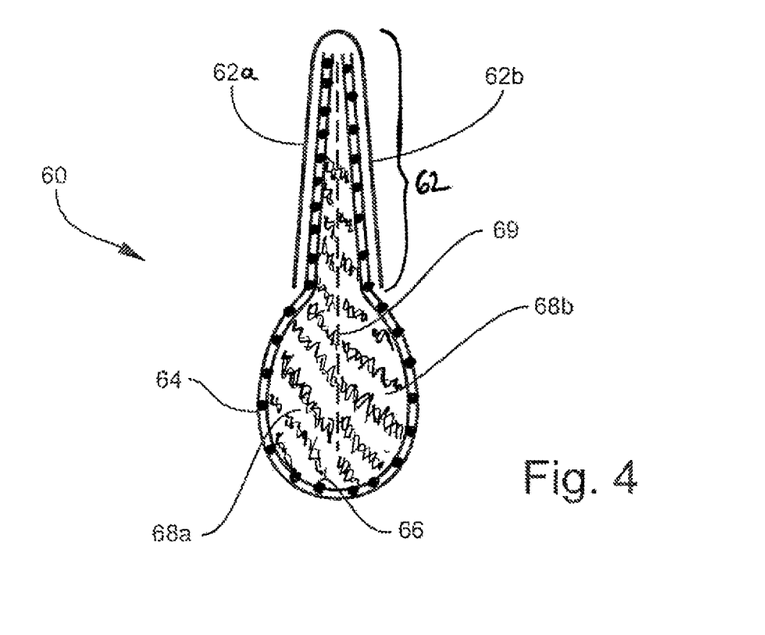
FIG. 4 is a cross-sectional view of another embodiment of a cushion-style door sweep of the present invention.
Figure 5:
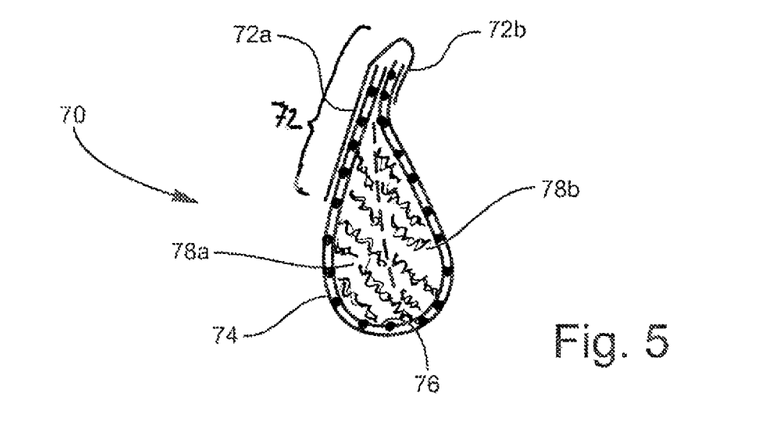
FIG. 5 is a cross-sectional view of another embodiment of a cushion-style door sweep of the present invention.

One can use a variety of different designs for the connecting member instead of that of the connecting member 18 shown in FIG. 1A, including, without limitation intended, those displayed as follows: FIG. 1B, a connecting member 110A having a single mounting aperture 112 (through which a screw, bolt, or other connecting hardware (not shown) is employed); FIG. 1D, connecting member 110B is of a similar form to connecting member 110A of FIG. 1B, here shown having two mounting apertures 112 and 113; FIGS. 2A and 3A display similar connecting members that attach to a door with one or two mounting apertures and have one or two fittings (see numerals 32, 32a, and 32b) designed for insertion of outer material formed with one or two T connecting ends (see numerals 36a, 36b, 50a, and 50b); FIG. 4, connecting member having approximately equal mirror-image sides 62a and 62b (collectively referred to herein as "connecting member 62") is intended for applications requiring a strong attachment to a wall or door, as appropriate, such as one used for sealing the gap about or at the edges of a dock leveler, and can be composed of any sheet metal that is formed by a simple bending process and mounted via apertures placed into the sides of the connecting member with appropriate attaching means, as known in the art; FIG. 5, connecting member having unequal sides 72a (the longer side) and 72b (the shorter side) (collectively referred to herein as "connecting member 72") and allowing for attachment through an aperture that needs only to go through the longer side 72a; and FIG. 6, connecting member having approximately equal mirror-image sides 82a and 82b (collectively referred to herein as "connecting member 82"), accommodates a larger sealing portion of the cushion variety.

The inner material 14 is preferably a metal or metal-containing substance, such as a metal sheet, a metal screen, a metal fabric comprised of metal wire or fibers, woven or non-woven, or a composite metal/nonmetal fabric comprised of metal and nonmetal wire or fibers, woven or non-woven. Such materials are described herein below as well as in co-owned U.S. Pat. Nos. 5,972,814, 6,249,941, 6,298,538, 6,502,289, 6,583,074, and 6,919,117, each of which are incorporated herein in their entireties by reference. The nonwoven metal fabrics identified herein can be obtained from Global Materials Technologies, Inc. ("GMT") of Chicago, Ill., which employs methods of manufacture as disclosed in the aforementioned patents.

One of the components of the inner material as displayed in FIGS. 1A, 1D, 2B, 2C, 3B, 3C, 4, 5, and 6 is indeed the just mentioned metal fibers. Turning to FIG. 7A, which displays a single metal fiber 91 having variable width cross-section and barbs, see e.g., numerals 93 and 95, a useful inner material comprises a mass or batt of such metal fibers 91 (FIG. 7A) and 20 (FIG. 9C). These metal fibers include a random irregular cross-section and rough outer surfaces with barb projections 200 and 95 formed on the outer surfaces. The irregular cross-sections vary continuously along the length of the resulting fibers to provide generally curled metal fibers. The curled and barbed nature of the metal fibers allows strong interengagement and intertwining with each other and the mesh layer (for those embodiments that include a mesh layer, also referred to as a scrim layer). In one embodiment, the metal fibers 20 are produced by shaving a metal member with a succession of serrated blades, as disclosed in commonly assigned U.S. Pat. Nos. 6,249,941 and 5,972,814, which are incorporated by reference. The succession of serrated blades has a variety of different serration patterns, so that the resulting individual fibers have barbed projections 200 and irregular cross sections with rough outer surfaces.

In certain embodiments, the metal fibers are shaved from a metal wire. For example, the metal fibers 20 can be produced by shaving a metal member with a succession of serrated blades, as disclosed in commonly assigned U.S. Pat. Nos. 6,249,941 and 5,972,814. The succession of serrated blades has a variety of different serration patterns, so that the resulting individual fibers have barbed projections 200 and irregular cross sections with rough outer surfaces. A suitable lubricant, such as oil, is applied to the metal member as it is being shaved by the blades in sufficient quantity so that the metal fibers retain on their outer surface a carding-effective amount of the oil or lubricant.

"Carding-effective amount" of oil or lubricant means that the metal fibers, when blended with the nonmetal fibers, can be carded without substantial breakage or disintegration. The lubricant optionally may be applied after the metal fibers are formed. The commonly assigned U.S. Pat. No. 5,972,814 discloses the process for shaving a metal bar to produce lubricated metal fibers and the use of such lubricated metal fibers. A carding-effective amount of oil generally may be in the range of about 0.3 wt. % to about 1.0 wt. % oil, more preferably about 0.4 wt. % to about 0.7 wt. %, based on the total weight of the metal fibers, although lesser or greater amounts may be used depending on the type and average cross-sectional length and width of the metal fibers. For example, as the weight percentage of metal fibers is decreased, the quantity of oil or lubricant necessary to provide a carding effective amount may tend to increase. Conversely, as the weight percentage of metal fibers increases, this reduces the quantity of oil needed for carding without breakage of the metal fibers. Thus, a carding-effective amount of oil for carding various combinations and amounts of metal fibers can be determined on a case-by-case basis.

Preferably, the metal fibers are made from any metal; for applications where rust and corrosion is appropriately retarded, stainless steel can be used. The metal fibers 20 can also be made from bronze, carbon steel, copper, metal alloys, and other suitable metals that can be shaved into suitable metal fibers to suit a variety of pest deterring entryway sealing applications. The metal fibers can have an average cross sectional length, width, or height of between about 25 and about 125 microns.

Figure 9A:
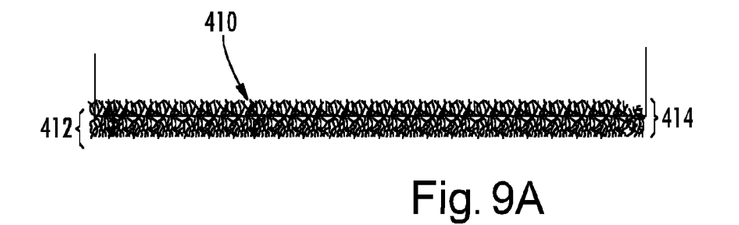
FIG. 9A is a cross-sectional view of one embodiment of the exclusion fabric.
Figure 9B:
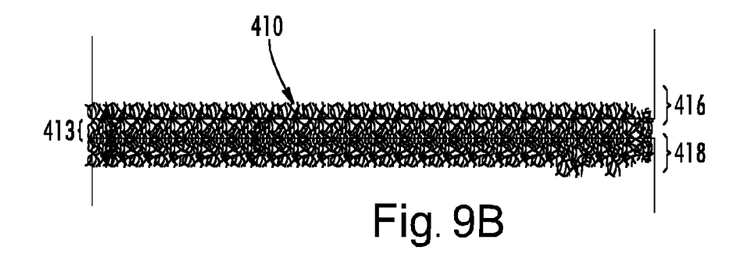
FIG. 9B is a cross-sectional view of another embodiment of the exclusion fabric.
Figure 9C:
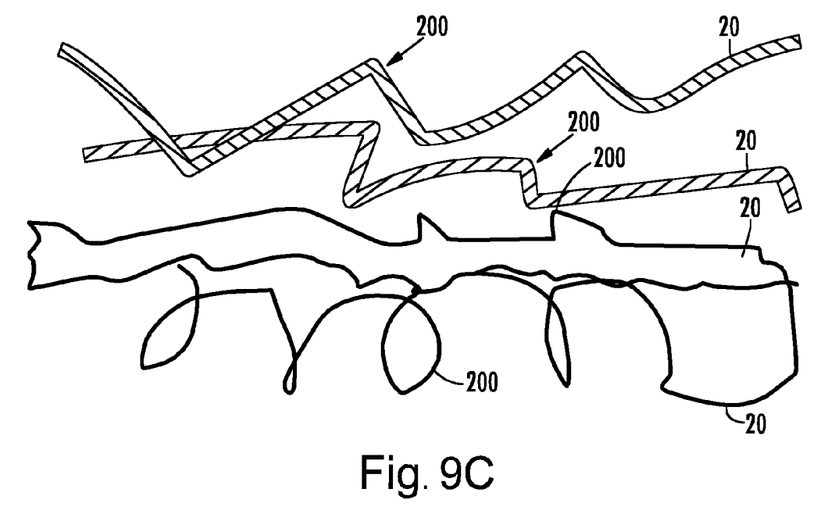
FIG. 9C is an enlarged perspective view of metal fibers used in the exclusion fabric employed in some of the embodiments of the present invention.

Another form of a metal fabric usefully employed in the context of the present invention is shown in FIGS. 9A and 9B. In one embodiment, as shown in FIG. 9A, a metal fabric 410 generally comprises a layer 414 of an interengaged mixture of a plurality of metal fibers 91 and a mesh layer 412, wherein the layer 414 of metal fibers is needle punched to the scrim layer to form the metal fabric 410.

In another embodiment, the metal fabric 410 comprises an interengaged mixture of a plurality of metal fibers 91, as shown in FIG. 7A. The metal fabric 410 generally comprises a layer 416 of metal fibers, a mesh layer 413 including a first side, for instance, a top side, and a second side, for instance, a bottom side; and a second layer 418 of metal fibers, wherein the first layer 416 of metal fibers is needle punched to the mesh layer on the first, or top, side and the second layer 418 of metal fibers is needle punched to the mesh layer on the second, or bottom, side to form a metal fabric 410 that is commonly referred to as an exclusion fabric (as indeed all of the metal fabrics noted herein are called).

Figure 7A:
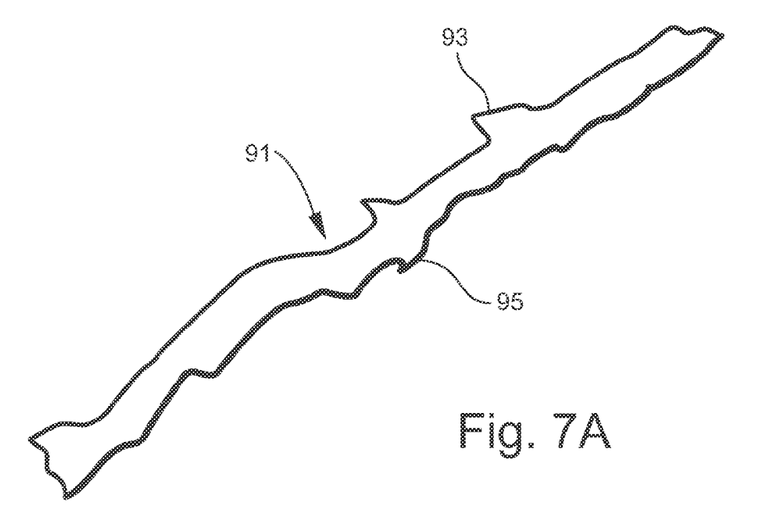
FIG. 7A is an enlarged perspective view of one of the metal fibers of the metal fabric displayed in FIG. 7B.
Figure 7B:
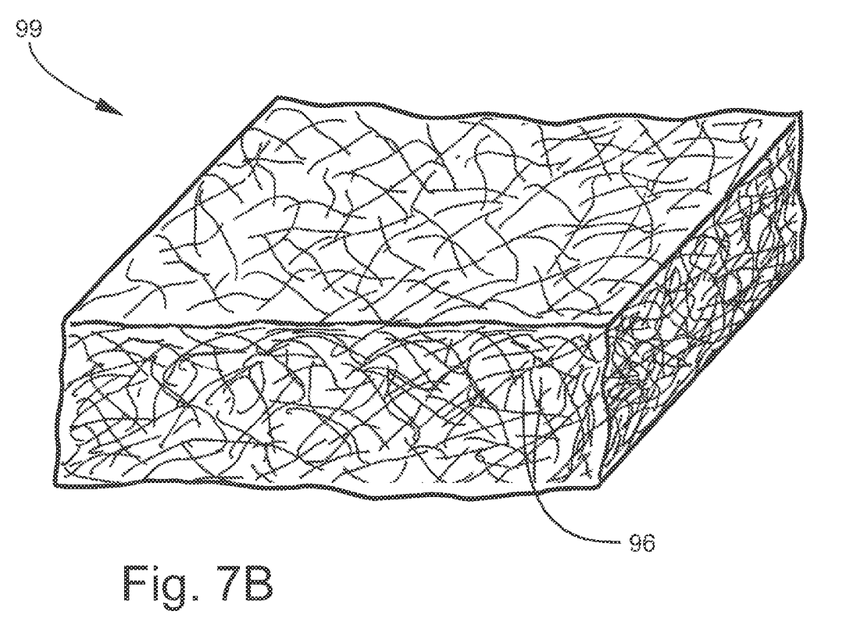
FIG. 7B is a perspective view of the metal fabric.

As noted above with regard to the simpler metal fabric 99 displayed in FIG. 7B, the metal fibers 91 are interengaged and intertwined and thus provide a density and resiliency for excluding pests in any environment.

Figure 8A:
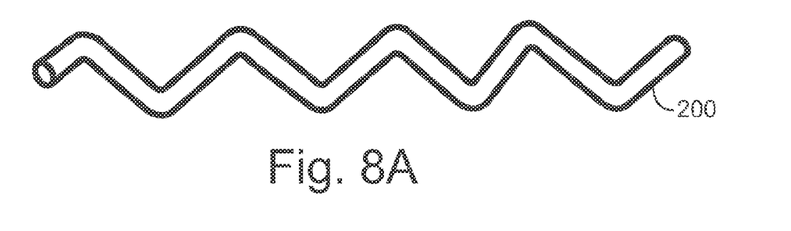
FIG. 8A depicts a magnified perspective view of a crimped nonmetal fiber useful in providing the composite nonwoven fabric of the invention.

Yet another metal fabric usefully employed for the entryway seals of the present invention also includes nonmetal fibers, as shown in FIG. 8. A nonmetal fiber 400 of the type used in forming a composite (i.e., metal and nonmetal) nonwoven fabric employed in some embodiments of the present invention, is shown in FIG. 8A. Such fibers may be essentially any synthetic or natural staple fibers conventionally used in the textile industry for making nonwoven fabric material, such as polypropylene, polyester, polyethylene, rayon, nylon, acetate, acrylic, cotton, wool, olefin, amide, polyamide, fiberglass and the like. The lengths of the nonmetal fibers may be from about 1 inch to about 12 inches, and are more preferably less than about 6 inches in length. It is presently preferred to use nonmetal fibers having length from about 1 to 3 inches. The nonmetal fibers may be cut to size by conventional means. The nonmetal fibers are less brittle than the metal fibers, and are generally unaffected by the carding process. The grade of the nonmetal fibers may range from about 1 denier to about 120 denier, more preferably from about 10 to about 80 denier and most preferably about 18 to about 60 denier. In general, the metal fibers will have an average cross-sectional diameter that is from ½ to 2-times the cross-sectional diameter of the nonmetal fibers. More preferably, the metal fibers and nonmetal fibers will have similar average diameters and lengths. A presently preferred composite nonwoven fabric comprises synthetic polymer fibers, such as polyester or polypropylene fibers, having a grade of about 60 denier and metal fibers having an average cross section of about 60 microns.

Crimped synthetic fibers having a repeating "V" shape along their length such as that shown in FIG. 8A, are known in the art. Crimped synthetic fibers having about 3 to 10 "V" shaped crimps per inch are preferred as the nonmetal fibers in the composite nonwoven fabrics of the present invention, with crimped fibers having about 7 crimps per inch being the most preferred. Of course, a greater or lesser degree of crimping may be selected as the particular application demands. Such crimped synthetic fibers are generally employed because they are readily carded by a garnett or carding machine.

The composite nonwoven fabric employed in the context of certain embodiments of the entryway sealing invention discussed herein has a ratio of metal fibers to non-metal fibers of between about 10:1 and about 1:99, by weight. In one embodiment, the composite nonwoven fabric comprises about 75 to about 95 wt. % metal fibers and about 5 to 25 wt. % nonmetal fibers, in another embodiment about 85 to about 92 wt. % metal fibers and, in yet another embodiment, about 8 to about 15 wt. % nonmetal fibers.

As will be appreciated by those skilled in the art, metal fibers are several fold denser than nonmetal fibers—that is the specific gravity of metal fibers is substantially greater than the specific gravity of synthetic fibers and other non-metal fibers. Accordingly, it will be understood that composite nonwoven fabric may have relatively similar numbers of metal fibers and nonmetal fibers, even though, on a weight percent basis, the composite nonwoven fabric is mostly metal.

It will also be appreciated by the person having ordinary skill in the art that "denier" is a measure of specific weight (or fineness) of a fiber which is arrived at by weighing a predetermined length of the fiber. (One denier equals 0.05 grams per 450 meters). Accordingly, different nonmetal fabrics having the same denier may have different cross-sectional diameters.

Some embodiments of the blade-type seal include an adhesive between the two outer materials 12a and 12b and either side of the inner material 14. Any suitable adhesive can be used, that is an adhesive capable of adhering to rubber or plastic as well as metal, including, without limitation intended, Scotch-Weld brand neoprene adhesive (3M, St. Paul, Minn.), Thixon or Megon brand adhesives (Rohm & Haas, Philadelphia, Pa.), and rubber-metal adhesive GMK 2410 (Weicon GmbH & Co. KG, Munster, Germany) Pressure-sensitive adhesives are also suitable adhesives for this purpose, including, without limitation, acrylics, butyl rubber, ethylene vinyl acetate, nitriles, silicone rubbers, styrene-butadiene-styrene, and the like.

Another embodiment of the blade-type seal can further include a screen disposed between one of the outer material layers 12a or 12b and the inner material 14; or, further yet, two screen layers can be included on either side of the inner material and the respective outer materials. The screen is preferably composed of a metal, but is flexible allowing for lateral motion of the blade-type seal as a door is opened or closed.

Figure 1E:
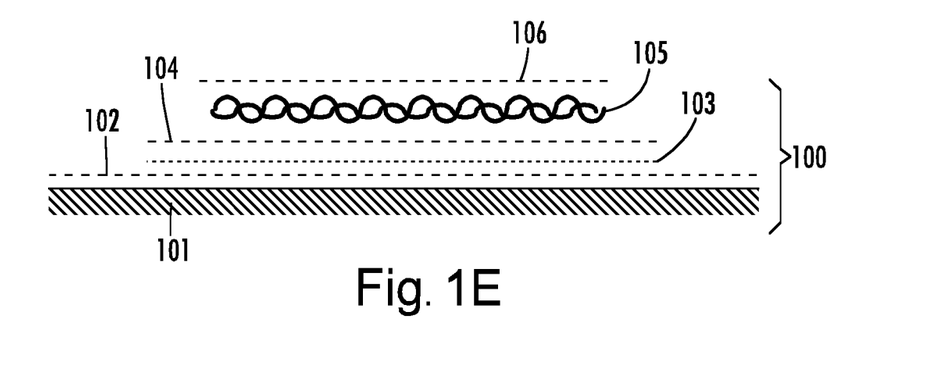
FIG. 1E is a cross-sectional view of the layers of one embodiment of the cushion-style prior to folding of the materials therefor in preparation for insertion into a mounting bracket.

An alternative embodiment of the present invention is shown in FIGS. 1D and 1E. The cushion-style seal 100 as shown is usefully employed as a door sweep for hinged swinging doors or as a door seal for vertically closing garage doors; or as a side seal for a garage-type door where there is a gap between the adjoining wall and the garage door track. As seen in FIG. 1D, the outside material 101 forms a bottom-rounded cushion that contains a series of internal layers: a first adhesive layer 102, a screen layer 103 (labeled 103a and 103b showing opposing sides of the screen and indicating continuity of the layer), and the inner material 105, shown with a second adhesive layer 106 (and showing a 106a and 106b portions, one of which is optional in this embodiment). The inner material 105 is shown with a and b sections to demonstrate the continuity between sections of the same structure that are joined by the second adhesive layer 106. Also included in this embodiment is a third adhesive layer 104 between the screen layer 103 and the inner material 105, which third adhesive layer 104 is optional in other otherwise similar embodiments. The screen layer 103 is shown extending up into the narrowed portion of the cushion formation 100 where the screen will be pierced and secured by a screw or other attachment hardware that enters one or both of the apertures 112 and 113. In an alternative embodiment, only one side of the screen is included in the narrowed portion.

FIG. 1E shows the same set of layers, but prior to the folding of the materials; in order from the top: second adhesive layer 106, inner material 105, third adhesive layer 104, screen layer 103, first adhesive layer 102, and outer layer 101. The various layers are folded into the cushion formation 100 and the end portions are placed into a connecting member such as the connecting member 110 or any of the other connecting members described above. The connecting member 110 is a bent sheet metal structure 111 that has one or more mounting apertures 112 and/or 113.

Figure 2B:
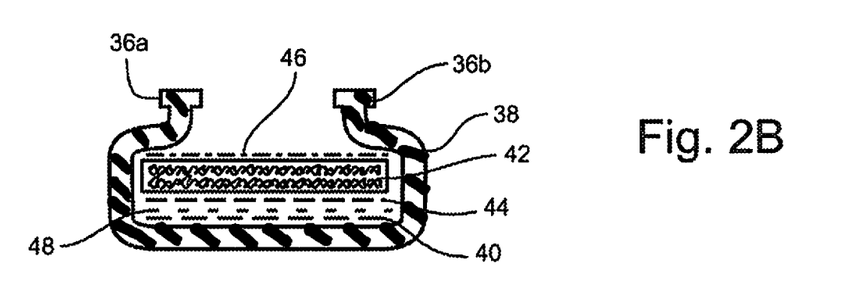
FIG. 2B is a cross-sectional view of one embodiment of a double-T end connecting door seal containing therein a section of an exclusion fabric in accordance with the present invention.
Figure 2C:
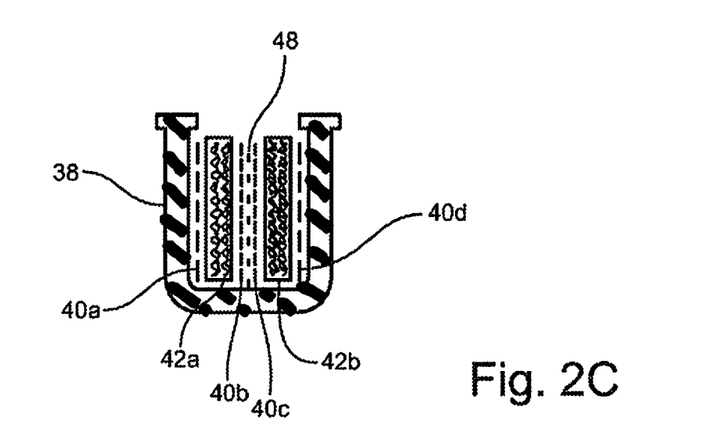
FIG. 2C is a cross-sectional view of another embodiment of a double-T end connecting door sweep of the present invention.

Another alternative embodiment of the present invention is shown in FIG. 2. There, a cushion-style door seal is depicted in a series of cross-sectional views of a connecting member (FIG. 2A); an embodiment where the inner material 42 and other internal components are disposed horizontally (FIG. 2B); and a second embodiment where the inner material 42 and other internal components are disposed vertically (FIG. 2C). Although not necessarily used only per design, the horizontally-disposed seal is considered optimally used for a vertically closing door, as in a garage door, whereas the vertically-disposed seal is considered optimally used as a door sweep for a vertically-hinged door.

As depicted in FIG. 2B, the horizontal layers of the cushion portion include the outer material 38, a first adhesive layer 40, a screen layer 48 (signified by: . . . ), an optional adhesive layer 44 (signified by: - - - ), the inner material 42 (signified by: rectangle with squiggly line or lines therein), and a cloth layer 46 (signified by: alternating long and short dashes) (Note: the same symbols are used consistently throughout the figures). The cloth layer 46 can be any cloth, synthetic or natural, employed for the purpose of rendering the metal fabric easily handled during assembly of the product. A preferred form of the cloth layer is a polyester. The internal layers are easily assembled and introduced into the outer material for this embodiment given that the two T end design is necessarily open.

The second embodiment as shown in FIG. 2C has layers of materials oriented vertically. In this particular embodiment, in the center position is a screen layer 48; moving horizontally in either direction, next is an adhesive layer 40b or 40c; followed by inner material 42a or 42b; followed by another adhesive layer 40a or 40c1; all of which is contained within the outer material 38. The screen presents resistance against deforming the cushion in the vertical dimension in this embodiment, which makes this configuration more appropriate for use as a door sweep.

Both embodiments shown in FIGS. 2B and 2C include the connecting member 28 (FIG. 2A) that has two T fittings 32a and 32b which are used to secure the cushion door sweep/seal outer material 38 that has two T connectors 36a and 36b. The connecting member is shown with two mounting apertures 112a and 112b, however only one can be used, or none (if, for example, the unit is mounted using an adhesive).

Figure 3B:
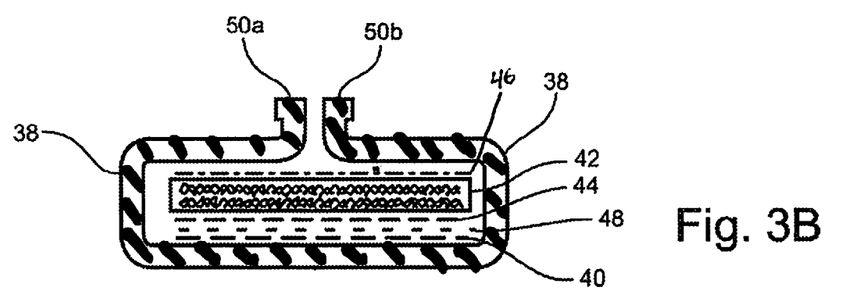
FIG. 3B is a cross-sectional view of one embodiment of a single-T end connecting door sweep containing therein a section of an exclusion fabric in accordance with the present invention.
Figure 3C:
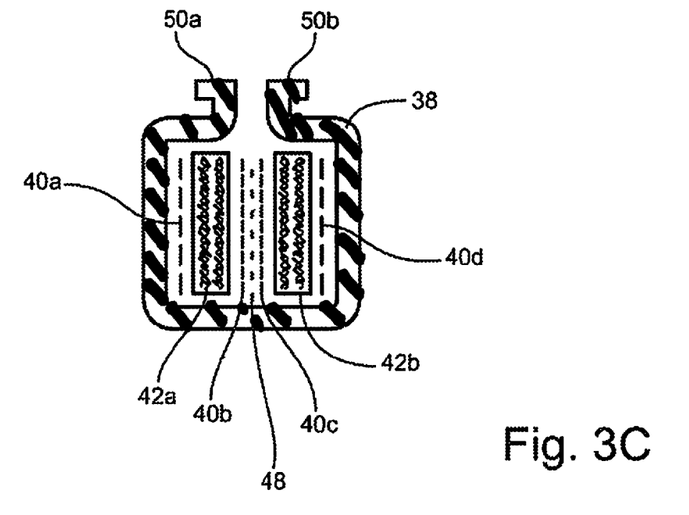
FIG. 3C is a cross-sectional view of one embodiment of a single-T end connecting door sweep of the present invention.

Yet a another embodiment is shown in FIGS. 3A, 3B, and 3C, showing a connecting member 28 that has a single T fitting 32 that secures the cushion-style door sweep/seal as shown in FIGS. 3B and 3C. The single T connector is formed upon use, half of which is on one end of the outer material 38 and the other half of which stems from the other end, which ends are identified by the numerals 50a and 50b. The prior art shows single T connectors attached to rubber or synthetic tubes, including some employed as door sweeps; but the tubes are closed making it virtually impossible to insert the layers of the internal elements employed for the present invention. Accordingly, a further invention hereof is an outer material 38 that splits the T connector into two parts such that the length of the tubular or squat outer material can be opened, the internal elements placed therein, and then closed thus forming the T junction between the two ends of the outer material.

The internal layers included in the embodiments displayed in FIGS. 3B and 3C are the same as those set forth above with respect to, respectively, FIGS. 2B and 2C. Obviously, both of the outer material embodiments disclosed with respect to these two figures can be set with other internal configurations and still be perfectly functional as a disappointment to rodents seeking entry therethrough. Accordingly, inclusion of a metal internally that spans the length of the seal remains key, but the particular structuring of the layers can vary.

Another alternative embodiment is shown in FIG. 4, wherein the connecting element 62 is generally manufactured from sheet metal that is bent at a mid point thus creating mirror-image sides 62a and 62b. The metal used can be any metal, including without limitation aluminum, steel, stainless steel, galvanized steel, copper, brass, and the like. Encased by the connecting element 62 is the outer material 64, a first adhesive layer 66, and the inner material 68. The inner material, in one embodiment, is a metal-containing fabric that is layed out on the just mentioned layers of outer material and adhesive; optionally, a second layer of adhesive can be applied to the other side of the metal fabric on all or one-half of the fabric, followed by folding the layers together and inserting same into the connecting member, followed by crimping same. The dashed line 69 represents the optional second layer of adhesive that binds the two halves of the inner material together.

In yet another embodiment of the door seal shown in FIG. 4, a screen material can be inserted between the outer material and the first adhesive layer 66, lending additional strength and some stiffness to the cushion seal. Particularly when the screen is included, this embodiment serves well as a door sweep.

Another embodiment is shown in FIG. 5, which differs from the structure of FIG. 4 only in the design of the connecting member 72. Formed of a metal, the connecting member has a longer side 72a and a shorter side 72b, which allows for an easier mounting job. Either side can contact the door surface. The internal elements and the outer material are as described with respect to the embodiments of FIG. 4.

Figure 6:
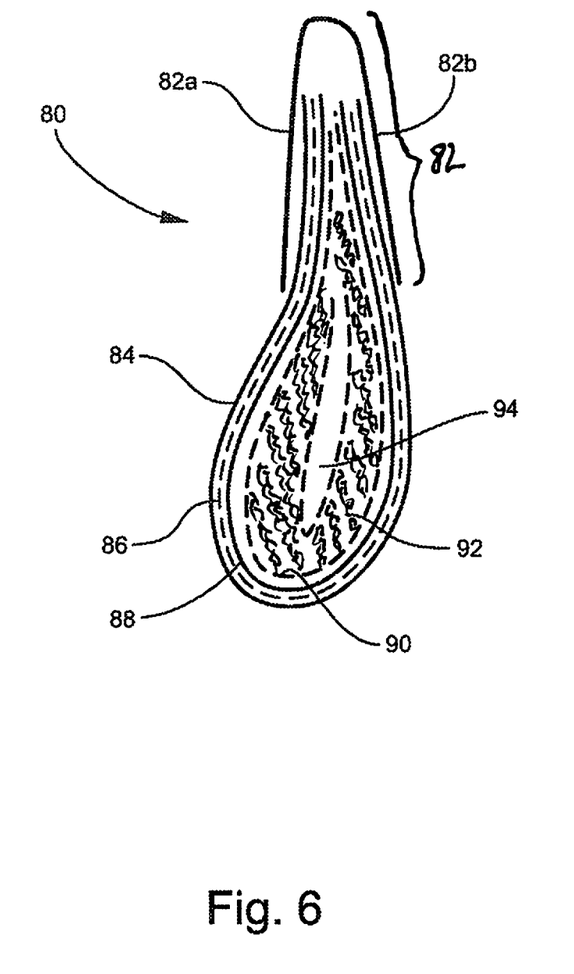
FIG. 6 is a cross-sectional view of another embodiment of a cushion-style door sweep of the present invention.

Yet another embodiment is illustrated in FIG. 6, which, in large measure, differs from the embodiments of FIG. 4 predominantly with regard to dimensions. Whereas any of the embodiments can have quite literally any dimensions of length and width by which they can span the length of the surface and gap to be sealed, the embodiment of FIG. 6 was designed particularly with regard to dock levelers and the gaps that exist there around. Accordingly, the length including connecting member is between 2.5 inches and about 3.5 inches, whereas other seals developed for doors and the like are generally between about 1.5 inches and 2.5 inches.

The dock leveler seal 80, in one embodiment thereof, has a connecting member 82 that is preferably manufactured from galvanized steel, which encases the upper portion of and holds the outer material 84. Internal to the outer material 84 is a first layer of adhesive 86, followed by a screen 88, followed by a second layer of adhesive 90, followed by the inner material 92 that includes metal.

More particularly, the apparatus of the present invention comprises (i) an outer material that substantially forms a seal between the door edge and the surface (i.e., the door frame and/or threshold, for example); (ii) an inner material proximately disposed to the interior surface of the outer material, which inner material is tear-resistant; and (iii) one or more connecting members that contact the outer material and connect(s) the apparatus to the edge of the door. The apparatus has a length that approximates the length of the door edge to which the apparatus is connected.

The outer material serves as a cushion for sealing. It is typically made of a flexible or pliable material that but for being pressed against the surface of the door frame or threshold would form an arcuate surface or a straight blade in the case of tube or blade, respectively. But, when pressed against the door frame or the threshold/floor when forming a seal of the closed door, the outer material flexes and thus, if a tube, it commonly flattens on one side or, if a blade, it commonly bends to a curve between its point of attachment to the door and the door frame or threshold against which it is pressed. Materials usefully employed to form the outer material are any that have the characteristic of flexibility and reversible adherence to a surface. The surface against which the outer material is pressed is commonly wood, concrete or metal, and may be a painted surface. The outer material is commonly formed from rubber or a synthetic that has characteristics of rubber, which synthetic may include, without limitation, polyvinylchloride, polyethylene, vinyl acetate, and the like; or polymers that combine two or more monomers described for the just-identified synthetics. Any suitable polymer will suffice for the role to the extent that the suitable polymer exhibits similar rubber characteristics of flexibility and tackiness, i.e., the ability to adhere reversibly to a surface.

The inner material serves to discourage any vermin that succeeds in tearing or gnawing its way through a portion of the outer material. The discouraging characteristic of the inner material is contributed by it being both tear-resistant and gnaw-resistant, thus presenting a barrier. This characteristic is associated with metallic substances, such as a solid metal insert, as, for example, a section of sheet metal that extended the length of the edge to which the door seal is attached. The chewing approach would be further discouraged to the extent that the fibers included sharp and/or piercing edges that could injure the lips or mouth of the vermin seeking entry. A yet further discouraging addition to the fibers include chemicals known to be noxious and/or toxic to the vermin.

An alternative inner material is a composition of metal fibers that are interengaged such that they cannot be pulled out or only pulled out with an extraordinary effort. Such a metal fiber is displayed in FIG. 7A, and a nonwoven fabric comprised of such metal fibers is displayed in FIG. 7B. The interengagement of the fibers results in a tear-resistant nonwoven fabric due to the irregular shapes of the metal fibers, as displayed in FIG. 7A. The inclusion of barbs 74 and 72 are common in these fibers, resulting in a gnaw-resistant fabric.

Figure 8B:
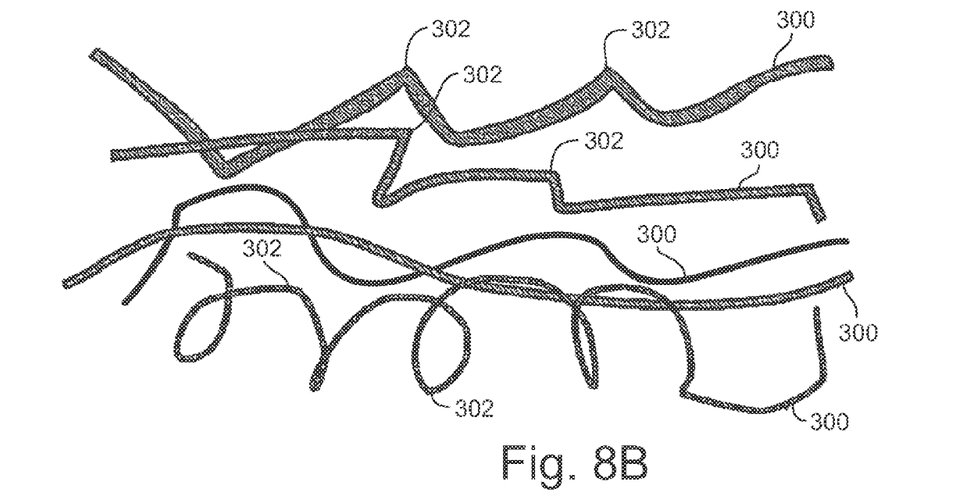
FIG. 8B depicts a magnified perspective view of the metal fibers of the composite nonwoven fabric of the invention.

Such a composition of metal fibers can be a blend of metal and synthetic fibers or metal fibers only. FIG. 8B displays a combination of metal and nonmetal fibers, which is further described in U.S. Pat. No. 6,919,117, which is incorporated herein by reference, and also below.

The third element of the apparatus, in one embodiment, is a connecting member that connects the apparatus to the edge of the door. Any suitable connecting member will suffice, including straps, braces, T-connectors, any other suitable fitting, and the like as are well-known to skilled artisans. In the instance of a blade outer material, a metal connecting element that along one long edge thereof attached to the blade having a form-shaped edge by sliding the form-shaped edge into a form-receiving edge of the element connector and attached to the door edge on its opposing long edge by means of any connecting hardware, such as a screw or a staple or a rivet.

In one embodiment, the inner material comprises a coated metal, where the coating of the metal is formed of a rubber or a synthetic, as described above. The outer material, in this embodiment, is the same as the inner material. In another embodiment, the outer material is different from the inner material.

In another embodiment, the inner material is a composite nonwoven fabric comprising an interengaged mixture of metal fibers and nonmetal fibers, the metal fibers having a rough barbed outer surface with irregularly shaped cross-sections that vary along their respective lengths.

In yet another embodiment, the present invention relates to an apparatus for connecting an edge of a door to a surface, which, upon said edge and said surface being connected by said apparatus, results in substantially impeding movement of fluid or vermin about the edge, which apparatus comprises: (i) an outer material that substantially seals the edge to the surface; (ii) an inner material that comprises (a) a first layer of metal fibers; (b) a mesh layer that includes a top side and a bottom side; and (c) a second layer of metal fibers; wherein the first layer of metal fibers and the second layer of metal fibers each include a plurality of barbed projections and a rough barbed outer surface with irregularly shaped cross-sections that vary along the lengths of the metal fibers and wherein further the metal fibers interengage with each other; and wherein the first layer of metal fibers is needle punched to the mesh layer on the top side and the second layer of metal fibers is needle punched to the mesh layer on the bottom side; and (iii) one or more connecting members that connect(s) the apparatus to the edge of the door; wherein the apparatus has a length that approximates the length of the edge to which the apparatus is connected.

Overall, the metal fibers used in the context of one embodiment of the present invention have a cross sectional diameter of between about 10 microns and about 250 microns, in another embodiment between about 25 microns and about 125 microns, and in yet another embodiment between about 50 microns and about 100 microns. The metal fiber can be any suitable metal fiber having characteristics of position memory, such as, for example, an aluminum, iron, steel or stainless steel metal fiber. In another embodiment, a suitable metal fiber is not only characterized with position memory but, as well, has substantial resistance to oxidation, such as, for example, a stainless steel or aluminum metal fiber.

Generally speaking, in certain embodiments hereof, the first layer of metal fibers has a basis weight of between about 200 g/m$^2$ and about 4000 g/m$^2$, alternatively between about 800 g/m$^2$ and about 2400 g/m$^2$, or, in yet a third alternative, between about 1000 g/m$^2$ and about 2000 g/m$^2$.

Another embodiment of the present invention relates to an apparatus for excluding vermin or weather from entry into the interior of a building at the perimeter of a door edge of a door when closed, which apparatus comprises: (i) an outer material that seals the edge to the surface; (ii) an inner material that comprises (a) a first homogenous web; (b) a mesh layer that includes a top side and a bottom side; and (c) a second homogenous web; wherein the first homogenous web and the second homogenous web each include at least two overlapping layers, and barbed projections and a rough outer surface with irregularly shaped cross-sections that vary along the lengths of the metal fibers, and wherein the first homogenous web is needle punched to the mesh layer on the top side and the second homogenous web is needle punched to the mesh layer on the bottom side; and one or more connecting members that connect(s) the apparatus to the edge of the door; wherein the apparatus has a length that approximates the length of the edge to which the apparatus is connected. The apparatus, in one embodiment, employs stainless steel metal fibers. Embodiments of this category include a first homogenous web that has a basis weight of between about 200 g/m$^2$ and about 4000 g/m$^2$, alternatively between about 800 g/m$^2$ and about 2400 g/m$^2$, or, in yet a third alternative, between about 1000 g/m$^2$ and about 2000 g/m$^2$.

Figure 8C:
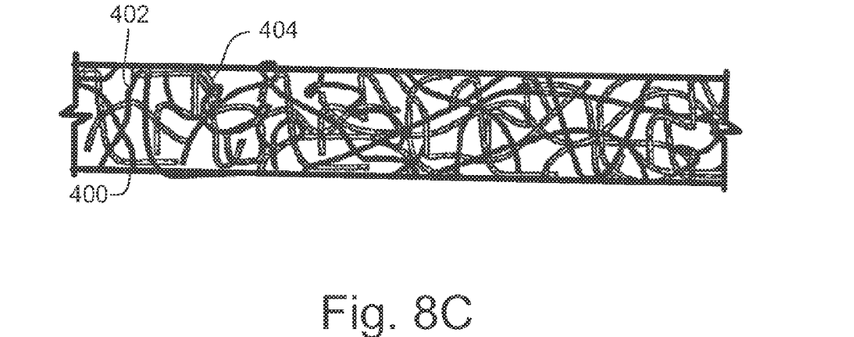
FIG. 8C is a magnified sectional view of the composite nonwoven fabric of the invention showing the random arrangement of the metal and nonmetal fibers.

In several embodiments of the present invention, the inner material or first homogenous web or second homogenous web is a nonwoven material comprised of metal and synthetic fibers that is referred to as an exclusion fabric, and is shown in FIG. 1A. This particular inner material, namely the exclusion fabric, is the subject of co-assigned U.S. patent application Ser. No. 13/051,318, filed Mar. 18, 2011, which is incorporated by reference herein. As more fully disclosed in the '318 application, FIG. 8A-C depicts a cross section of two different such fabrics that have the nonwoven blend of metal and synthetic fibers 60, where one has the blend extending from two sides of the mesh 15 and the other has the blend extending only from one side thereof. Also shown is a blow-up of the jagged metal fibers 200 in FIG. 5.

In one embodiment, the plurality of metal fibers 20 is shown in FIG. 5. The metal fibers 20 include a random irregular cross-section and rough outer surfaces with barb projections 200 formed on the outer surfaces. The irregular cross-sections vary continuously along the length of the resulting fibers to provide generally curled metal fibers. The curled and barbed nature of the metal fibers allows strong interengagement and intertwining with each other and the mesh layer. In one embodiment, the metal fibers 20 are produced by shaving a metal wire with a succession of serrated blades, as disclosed in commonly assigned U.S. Pat. Nos. 6,249,941 and 5,972,814, which are hereby incorporated by reference. The succession of serrated blades has a variety of different serration patterns, so that the resulting individual fibers have barbed projections 200 and irregular cross sections with rough outer surfaces.

A suitable lubricant, such as oil, is preferably applied to the metal member as it is being shaved by the blades in sufficient quantity so that the metal fibers retain on their outer surface a carding-effective amount of the oil or lubricant. "Carding-effective amount" of oil or lubricant means that the metal fibers, when blended with the nonmetal fibers, can be carded without substantial breakage or disintegration. The lubricant optionally may be applied after the metal fibers are formed. The commonly assigned '814 patent discloses the process for shaving a metal bar to produce lubricated metal fibers and the use of such lubricated metal fibers. A carding-effective amount of oil generally may be in the range of about 0.3 to 1.0 wt. % oil, more preferably about 0.4 to 0.7 wt. %, based on the total weight of the metal fibers, although lesser or greater amounts may be used depending on the type and average diameter of the metal fibers. For example, as the weight percentage of metal fibers is decreased, the quantity of oil or lubricant necessary to provide a carding effective amount may tend to increase. Conversely, as the weight percentage of metal fibers increases, this reduces the quantity of oil needed for carding without breakage of the metal fibers. Thus, a carding-effective amount of oil for carding various combinations and amounts of metal fibers can be determined on a case-by-case basis. Preferably, the metal fibers are made from stainless steel, as to prevent rusting and corrosion of the exclusion fabric. However, the metal fibers 20 can also be made from bronze, carbon steel, copper, metal alloys, and other suitable metals that can be shaved into suitable metal fibers to suit a variety of pest deterring applications. The metal fibers can have an average cross sectional diameter of between about 25 microns and about 125 microns.

Reels of metal fibers are made from individual strands of metal fibers, which are gathered together. When the metal fibers are shaved with the serrated knives, individual strands of metal fibers are produced. The individual strands of metal fibers from various serrated knives or blades are gathered together and processed through a set of rolls to flatten and form a web of fibers of a certain width and weight. The width of the web of metal fibers can vary from 1 inch wide to 12 inches wide depending on the weight of the web of metal fibers desired. The web of metal fibers is then rolled up into a reel that can be further processed. The weight of the web of metal fibers is determined by the weight per 2 foot length of the web of metal fibers. To keep a consistent metal wool reel, the weights of the reel webs stay consistent throughout the length and width of the metal wool reel. The metal wool reels are used to a wider roll of material when lined up side by side. The metal wool reels may have a basis weight between about 800 g/m$^2$ to about 2400 g/m$^2$.

The mesh layer 14 may be an open woven mesh layer, a spunbonded adhesive fiber mesh ply, a nylon mesh layer, or a polyester mesh layer, or a nonwoven material. The mesh can be made up of various materials, such as polyester, polypropylene, nylon, polyvinylchloride ("PVC"), or any number of other suitable materials that allows for needle punching the metal wool reels on the top and bottom sides. The mesh provides added strength to the geotextile in both the x-direction and the y-direction. Then with the needle punching of the metal fibers through the top and bottom sides of the mesh layer, the exclusion fabric will have the strength in the z-direction. The basis weight of the mesh layer may vary from 90 g/m$^2$ to about 500 g/m$^2$, depending on the type of mesh layer used. The mesh layer in one embodiment may include a basis weight of about 90 g/m$^2$. Mechanical bonding of the mesh layer can be hydro-entanglement, air-jet entanglement, needle punching, needle stitching, or by any other mechanical bonding method known in the art that may increase the strength of the mesh layer for z-directional strength during needle punching the top and bottom sides of the mesh layer with metal fibers. In one example, the polyester mesh ply can have a basis weight of 120 g/m$^2$.

As noted above, a usefully employed inner material can comprise a composite web material of metal and nonmetal fibers formed into an integrated matrix structure. The metal fibers preferably have rough outer surfaces that are irregular in cross-section with barbed projections. The nonmetal fibers are preferably crimped synthetic fibers. The intertwined mix of metal and nonmetal fibers comprising a nonwoven fabric employed in the context of the present invention provides surprising isotropic strength and structural integrity to the fabric and, as well, the inventive apparatus described herein.

The composite nonwoven fabrics employed in the context of the present invention comprise metal fibers having an average cross-sectional diameter of from about 25 microns to about 125 microns, or more, and preferably have an average diameter of about 50 microns to about 100 microns, more preferably have an average diameter of about 70 microns to about 90 microns; and, overall, in one embodiment are about 80 microns to about 90 microns. Fibers greater than about 50 microns in diameter are stronger. Thus, the use of metal fibers having an average diameter greater than about 50 microns strengthens the composite nonwoven fabrics and, thus, strengthens the door sweeps and s of the present invention. The barbs and irregular surfaces of the metal fibers provide the composite non-woven fabric a desired abrasive quality that deters vermin, and helps maintain the interentanglement of the fibers. Variables that can be controlled include the size of the fibers and the weight ratios between the metal and nonmetal fibers used in the product.

If desired, the exclusion fabric, or another metallic inner material usefully employed in the context of the present invention, may optionally include various additives, such as insect repellents and animal repellents, which may enhance the performance of the inventive apparatus as a vermin deterrent.

Of course it is plainly the case that a gnawing animal can damage the outer material as set forth herein; however, upon reaching the inner material and/or, if present, the screen as employed in the present invention, the gnawing animal will stop. Gnawing at metal screens or metal or metal fabric is not an easy path and is highly likely to dissuade the vermin. Neither will they succeed by tearing at the metal fabric in view of the highly interengaged fibers included therein. But, that leaves a damaged outer material, which can be repaired with a patch applied with an appropriate adhesive or heat fusion method, as known in the art.

While preferred embodiments of the present invention have been shown and described herein, it will be obvious to those skilled in the art that such embodiments are provided by way of example only. Numerous variations, changes, and substitutions will now occur to those skilled in the art without departing from the invention or the definitions provided herein for clearly recording inventor's conception and embodiments thereof. It should be understood that various alternatives to the embodiments of the invention described herein may be employed in practicing the invention.

It is intended that the following claims define the scope of the invention and that methods and structures within the scope of these claims and their equivalents be covered thereby.

What is claimed is:

1. A sealing apparatus for substantially sealing a gap disposed between a moveable closure and an adjacent surface, and for substantially impeding passage of vermin through the gap, the sealing apparatus comprising:
   a connecting member having at least one elongated channel and a mounting surface for mounting to the movable closure;
   a sealing element having an outer flexible layer and an inner core, wherein the outer flexible layer is disposed around the inner core and includes longitudinal ends disposed within the at least one elongated channel to mount the sealing element to the connecting member;

the inner core being substantially surrounded by at least a portion of the flexible layer, and the inner core comprising a plurality of metal fibers having barbed projections.

2. The sealing apparatus according to claim 1, wherein the inner core has a barbed outer surface.

3. The sealing apparatus according to claim 1, wherein the plurality of metal fibers comprises metal wool.

4. The sealing apparatus according to claim 1, wherein the plurality of metal fibers comprises steel wool.

5. The sealing apparatus according to claim 1, wherein the plurality of metal fibers comprises stainless steel wool.

6. The sealing apparatus according to claim 1, wherein the inner core comprises a non-woven textile material.

7. The sealing apparatus according to claim 1, wherein the inner core comprises a nonwoven web of a combination of the metal fibers and nonmetal fibers.

8. The sealing apparatus according to claim 1, wherein the inner core comprises a nonwoven web of a combination of the metal fibers and nonmetal fibers, wherein the metal fibers and the nonmetal fibers are interengaged with each other by a needle punching process.

9. The sealing apparatus according to claim 1, further comprising a mesh layer disposed between the flexible layer and the inner core.

10. The sealing apparatus according to claim 9, further comprising at least one adhesive layer disposed adjacent at least one surface of the mesh layer.

11. The sealing apparatus according to claim 9, wherein the mesh layer comprises a screen.

12. The sealing apparatus according to claim 9, further comprising a first adhesive layer disposed adjacent a first surface of the mesh layer and a second adhesive layer disposed adjacent a second surface of the mesh layer.

13. The sealing apparatus according to claim 1, wherein the flexible layer comprises a rubber material.

14. The sealing apparatus according to claim 1, wherein the flexible layer, the inner core, and the connecting member each extend along a longitudinal axis and each has substantially the same longitudinal length.

* * * * *